United States Patent [19]

Hatori et al.

[11] 4,014,268
[45] Mar. 29, 1977

[54] STEERING CONTROL MECHANISM

[75] Inventors: Yukiyoshi Hatori, Tokyo; Hiroshi Sugiyama, Hiratsuka, both of Japan

[73] Assignee: Nissan Motor Co., Ltd., Japan

[22] Filed: Aug. 14, 1975

[21] Appl. No.: 604,781

[30] Foreign Application Priority Data

Aug. 16, 1974 Japan .............................. 49-93967

[52] U.S. Cl. ................................ 104/247; 180/131
[51] Int. Cl.[2] ........................................ B61B 12/02
[58] Field of Search .......... 180/79, 131; 104/244.1, 104/245, 247; 46/243 P, 244 R; 280/87.2

[56] References Cited

UNITED STATES PATENTS

| | | | |
|---|---|---|---|
| 2,222,916 | 11/1940 | Schaa | 104/244.1 |
| 2,468,158 | 4/1949 | Bartholomew | 104/247 |
| 2,992,692 | 7/1961 | Chausson | 180/79 |
| 3,393,762 | 7/1968 | Matson | 180/79 |

FOREIGN PATENTS OR APPLICATIONS

| | | | |
|---|---|---|---|
| 2,005,452 | 12/1969 | France | 104/245 |
| 851,256 | 10/1960 | United Kingdom | 104/244.1 |

*Primary Examiner*—Joseph F. Peters
*Assistant Examiner*—John A. Pekar
*Attorney, Agent, or Firm*—Robert E. Burns; Emmanuel J. Lobato; Bruce L. Adams

[57] ABSTRACT

A guide arm is mounted via a ball joint to a support structure. A guide linkage, connected to the arm and foldable at its mid point, is also connected by a ball joint to the support structure. A second guide linkage guides the arm to a near vertical storage position when a motor folds the first linkage.

21 Claims, 6 Drawing Figures

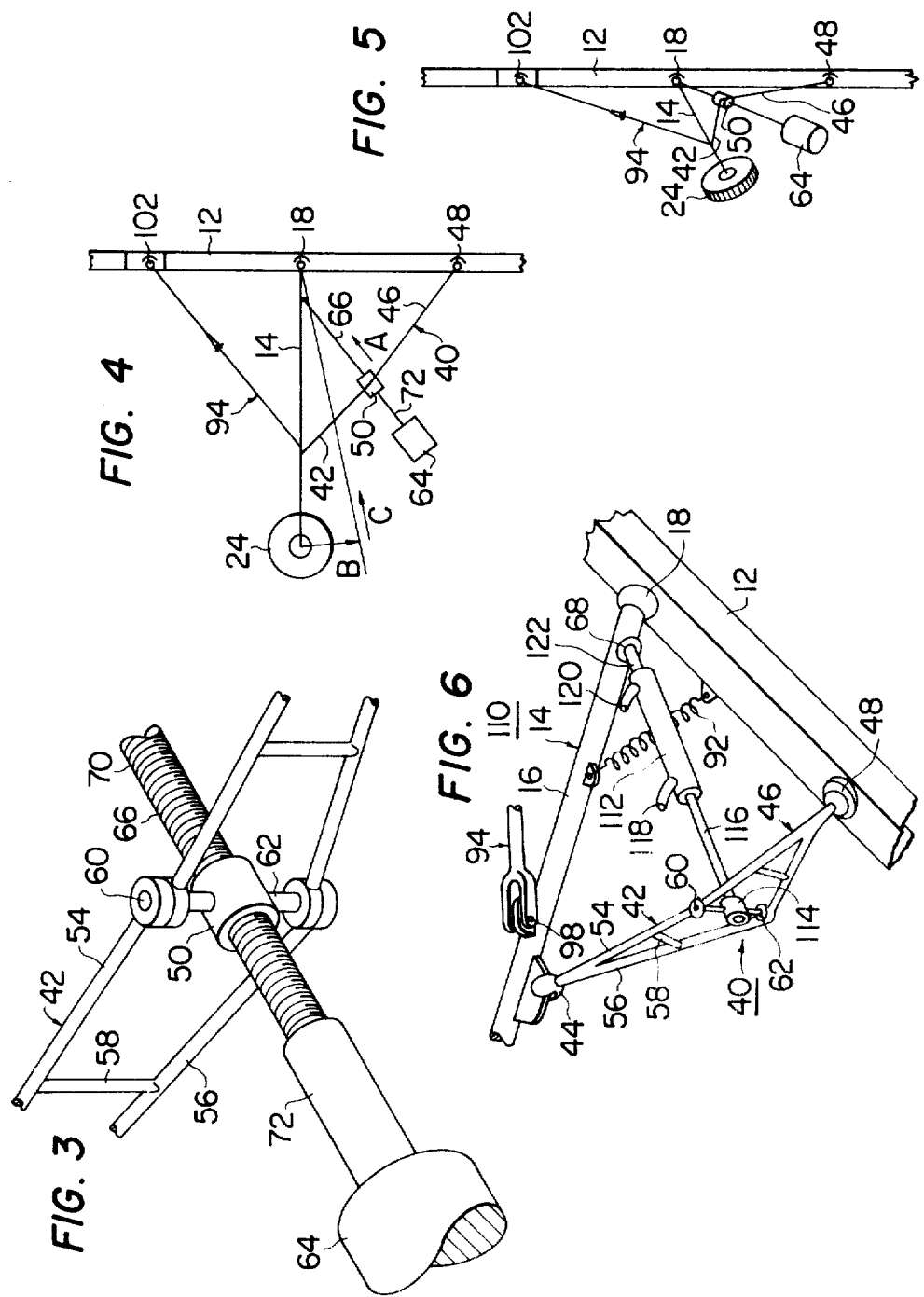

4,014,268

STEERING CONTROL MECHANISM

BACKGROUND OF THE INVENTION

The present invention relates generally to an automatic steering control mechanism for a vehicle such as a dual-mode bus and particularly to an automatic steering control mechanism of this type which can be compactly stored in the vehicle with the guide arm raised near the vertical position and extending upwardly and obliquely from a support frame structure.

As is well known in the art, numerous transportation systems including a dual-mode bus system have been currently proposed for solving the transportation problems. The dual-mode bus system is such that the bus is steered and operated manually by an operator in suburban areas in which traffic is scattered and automatically by a suitable automatic control system in urban areas in which traffic is congested.

A dual-mode bus is usually provided with a steering control mechanism which is brought into engagement with the steering system of the bus during travel on the guideway in urban areas and which automatically guides the direction of travel of the bus along the guideway in response to the guide rail of the guideway. It is necessary that the steering control mechanism be stored in the bus since it is not employed during travel on ordinary roads in suburban areas. Furthermore, a conventional dual-mode bus has been provided with steering control mechanisms only at front parts of the bus. As a result, when the bus travels on a curvilinear guideway, there has been a risk that a rear part of the bus body collides with the guide rail.

SUMMARY OF THE INVENTION

It is, therefore, an object of the invention to provide a steering control mechanism which can be stored in the vehicle compactly, the guide arm being raised almost vertically and extending upwardly and obliquely from a support frame structure.

It is a further object of the invention to provide a steering control mechanism, which can be stored in the vehicle at the compact condition, which is combined with the vehicle so that the vehicle body is surely held in the center of the guideway to prevent a rear part of the vehicle body from touching or colliding with the guide rail of a curvilinear guideway during travel on same.

These and other objects and advantages of the invention will become more apparent from the following detailed description taken in connection with the accompanying drawings in which:

BRIEF DESCRIPTION OF THE DRAWINGS

FIG. 3 is an schematic perspective view on an enlarged scale of a part of the steering control mechanism shown in FIG. 2;

FIG. 4 is a schematic plan view of the steering control mechanism shown in FIG. 2 which is in an operative position;

FIG. 5 is a schematic plan view of the steering control mechanism shown in FIG. 2 which is in a storage position; and FIG. 6 is a schematic view of a second preferred embodiment of a steering control mechanism according to the invention.

DESCRIPTION OF THE PREFERRED EMBODIMENTS

Figure 1:
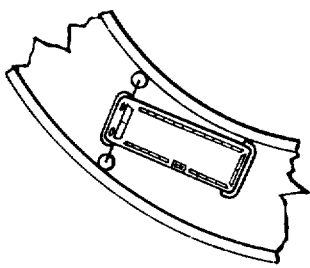
FIG. 1 is a fragmentary schematic view of a prior art dual-mode bus which is provided with a conventional steering control mechanism only at a front part of the bus body.

Referring to FIG. 1 of the drawings, there is shown a prior art dual-mode bus which is provided with conventional steering control mechanisms only at front parts of the vehicle body so that a rear part of the vehicle body touches the guide rail or wall of the curvilinear guideway as described hereinbefore.

Referring to FIGS. 2 to 5 of the drawings, there is shown a first preferred embodiment of an automatic steering control mechanism or system according to the invention. The steering control mechanism, generally designated by the reference numeral 10, is provided in a vehicle such as a dual-mode bus (not shown) on each of its front left and right and rear left and right sides, which is steered or operated manually by an operator in suburban areas and automatically by a suitable automatic control system and on a guideway in urban areas. Only one steering control mechanism 10 is illustrated as being incorporated into the vehicle on its front left side, for the purpose of simplicity.

The steering control mechanism 10 comprises a support frame structure 12 fixedly secured to or forming part of the body of the vehicle, and guide arm 14 connected to the support structure 12 and universally rockable relative to the support structure 12. The guide arm 14 extends laterally or perpendicular to the longitudinal direction of the support structure 12 or the vehicle and along or parallel to the surface of a guideway (no numeral) for the vehicle when it is in an operative position shown in FIGS. 2 and 4.

The guide arm 14 comprises a cylindrical rod 16 connected at one end to the support structure 12 through a ball joint 18, and a cylindrical housing 20 formed therein with a bore (no numeral) having open and blind ends. The rod 16 is telescopically received at the other end in the bore of the housing 20. A clevis or shackle 22 is rigidly secured to the outer end of the housing 20. A guide follower or sensor 24 is supported by the clevis 22 so that it is rotated parallel to the surface of the guideway. A castor 26 is fixedly secured to a lower flange 27 of the clevis 22 and is in rolling contact relationship with the surface of the guidway to support the guide arm 14 and when the guide arm is in an operative position. The guide roller 24 is in rolling contact relationship with a guide wall or structure (not shown) of the guideway when the guide arm 14 is in an operative position. A spring (not shown) is incorporated in the housing 20 to urge the guide roller 24 to the guide wall. A damper (not shown) is also incorporated in the housing 20. The guide roller 24 and the guide arm 14 are actuated to control or guide the direction of travel of the vehicle in the direction of the axis of the guideway in response to the contour of the guide wall. The guide arm 14 is rockable from the operative position into a storage or inoperative position shown in FIG. 5 in which the guide element 24 is out of engagement with the guide wall to disenable guiding the vehicle along the guide wall.

A linkage 28 is provided to prevent the housing 20 from being rotated about its axis relative to the rod 16 to maintain the guide roller 24 and the castor 26 parallel and perpendicular to the surface of the guideway, respectively. The linkage 28 has a first link 30 pivotably connected to the housing 20 through a pin joint 32 and a second link 34 pivotably connected to the rod 16 through a pin joint 36. The second link 34 is pivotably connected to the first link 30 through a pin joint 38 so that the first and second links 30 and 34 are swingable relative to each other in the direction of the axis of the guide arm 14 to allow axial relative movement between the rod 16 and the housing 20 and are non-rotatable relative to each other about the axis of the guide arm 14 to inhibit rotation of the housing 20 relative to the rod 16.

A first control arm or linkage 40 is provided which is foldable at its mid portion to swing the guide arm 14 toward and away from the support structure 12 and comprises a first link 42 pivotably connected at one end to the guide arm 14 through a pin joint 44, a second link 46 connected at one end to the support structure 12 through a ball joint 48, and a collar 50 forming a junction between the first and second links 42 and 46. The links 42 and 46 each are pivotably connected at the other end to the collar 50 so that they are rockable relative to each other. The first control linkage 40 is universally rockable relative to the support structure 12. Each of the links 42 and 46 comprises opposite upper and lower beams 54 and 56 joined together at the one end and diverted from each other toward the other end to form the character V and a brace 58 extending laterally between and connected to the beams 54 and 56 in order to increase resistance to deformation caused by a load applied to the first control linkage 40. The upper beams 54 are connected to the collar 50 through a pin joint 60 and the lower beams 56 are connected to the collar 50 through a pin joint 62. The collar 50 is formed with a bore extending therethrough (no numeral) having internal threads formed on its internal wall.

Figure 2:
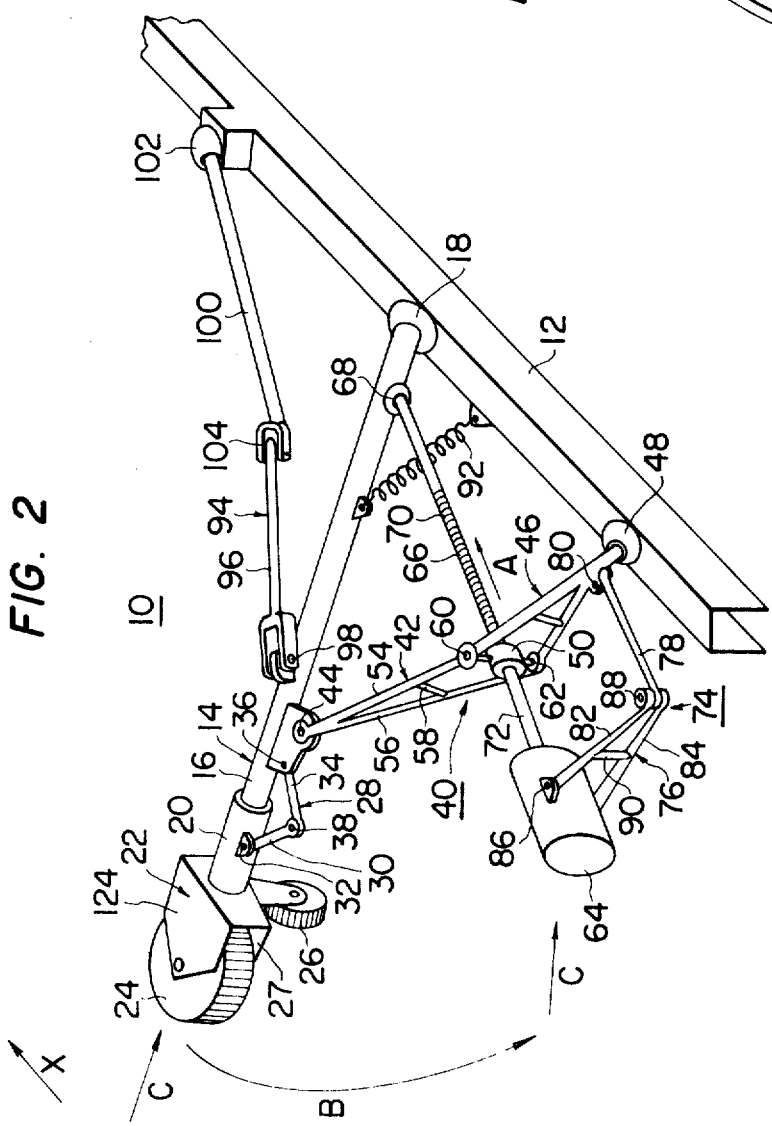
FIG. 2 is a schematic perspective view of a first preferred embodiment of a steering control mechanism according to the invention.

Operating means is provided to move the collar 50 toward the guide arm 14 to fold the links 42 and 46 toward each other. The operating means comprises an electric motor 64 and an actuating rod or shaft 66 extending from the motor 64 to the guide arm 14 through the bore of the collar 50. The rod 66 is connected to the guide arm 14 through a ball joint 68 so that it is rotatable about its axis and universally rockable relative to the guide arm 14. The rod 66 is formed therein with external threads 70 engaging the internal threads of the collar 50. The rod 66 is rotated about its axis in opposite directions by the motor 64 to move the collar 50 on the rod 66 toward and away from the ball joint 68 so that the guide arm 14 is swung toward and away from the support structure 12, respectively. The rod 66 has a non-threaded, enlarged portion 72 located between the motor 64 and the collar 50. The enlarged portion 72 serves as a stop which the collar 50 abutts to prevent it from being excessively moved along the rod 66 toward the motor 64 when the rod 66 is rotated in a direction to return the guide arm 14 from the storage position into the operative position. It is desirable that the end of the enlarged portion 72 which the collar 50 abutts is located in such a manner that the collar 50 is held in a position in which the links 42 and 46 convexly extend away from the ball joint 68 as shown in FIGS. 2 and 4 when the guide arm 14 is in the operative position. This is because of the collar 50 being moved toward the ball joing 68 to swing the guide arm 14 toward the support structure 12 as shown by the arrow B in FIG. 2 when the rod 16 is axially moved toward the support structure 12, owing to a gap existing in the ball joint 68, by a reaction from the guide wall shown by the arrow C in FIG. 2 if the links 42 and 46 are in alignment with each other or in the form of a convex facing the ball joint 68 when the guide arm 14 is in the operative position. The motor 64 has a speed reducer (not shown) and may be connected to an electric power source such as a battery (not shown), equipped in the vehicle, for operation thereof.

A linkage 74 is provided to contact the motor 64 to the first control linkage 40 to support the motor 64. The linkage 74 comprises a first link 76 pivotably connected to the motor 64, and a second link 78 pivotably connected to the second link 46 of the linkage 40 through a pin joint 80. The first link 76 comprises opposite upper and lower beams 82 and 84 which diverge from each other toward the motor 64 and are connected to the motor 64 through a pin joint 86 and to the second link 78 through a pin joint 88. A brace 90 extends laterally between and is connected to the beams 82 and 84.

A spring 92 is connected at one end to the guide arm 14 between the pin joint 44 and the ball joint 68 and at the other end to the support structure 12 between the ball joints 18 and 48 and urges the guide arm 14 toward the support structure 12.

A second control arm or linkage 94 is provided which serves to lift the guide arm 14 from the operative position into the inoperative position when the guide arm 14 is swung toward the support structure 12 by the first control linkage 40 and to lower the guide arm 14 from the inoperative position into the operative position when the guide arm 14 is swung away from the support structure 12 by the first control arm 40. The guie arm 14 is located between the first and second control arms 40 and 94. The second control arm 94 comprises a first link 96 pivotably connected at one end to the guide arm 14 through a pin joint 98 and a second link 100 connected at one end to the support structure 12 through a ball joint 102 and at the other end to the first link 96 through a pin joint 104. The linkage 94 is universally rockable relative to the support structure 12. The links 96 and 100 are not in alignment with each other but are loosely hung as shown in FIG. 2 so that no force is exerted on the guide arm 14 from the support structure 12 through the linkage 94, that is, the linkage 94 has no influence on the positioning of the guide arm 14, when the guide arm 14 is in the operative position. The ball joint 102 is located at a level higher by a suitable value H than the ball joint 18 as shown in FIG. 2 so that the links 96 and 100 loosely hung are prevented from touching, at the junction therebetween, the surface of the guideway.

The support structure 12 is located in a place in the vehicle and a suitable space is provided in the vehicle in such a manner that the steering control mechanism 10 can be stored in the vehicle when it is in the storage position.

The steering control mechanism 10 thus far described operates as follows.

When the steering control mechanism 10 is stored in the vehicle or is shifted from the operative position into the inoperative position the motor 64 is operated to rotate the rod 66 about its axis so that the collar 50 is moved on the rod 66 toward the ball joint 68 as shown by the arrow A in FIG. 2. The links 42 and 46 of the first control linkage 40 are swung toward each other by the thus moved collar 50 so that the pin joint 44 is moved toward the ball joint 48, that is, the guide arm 14 is swung toward the support structure 12 along the surface of the guideway as shown by the arrow B in FIG. 2. As a result, the links 96 and 100 of the second control linkage 94 are brought into alignment with each other and the pin joint 98 is caused to describe a spherical locus about the ball joint 102 so that the guide arm 14 is raised into the storage position shown in FIG. 5. Thus, the steering control mechanism 10 is surely and compactly stored in the vehicle.

Referring to FIG. 6 of the drawings, there is shown a second preferred embodiment of an automatic steering control mechanism according to the invention. The steering control mechanism, generally designated by the reference numeral 110, is different from the steering control mechanism 10 shown in FIGS. 2 and 3 in that a hydraulic cylinder 112 is employed as the driver means in lieu of the electric motor 64 and a cylindrical member 114 and a non-threaded actuating rod or shaft 116 are provided in lieu of the collar 50 and the rod 66 of the steering control mechanism 10. As shown in FIG. 6, like component elements are designated by the same reference numerals as those used in FIGS. 2 and 3. Upper beams 54 and lower beams 56 are pivotably connected to the member 114 through pin joints 60 and 62, respectively. The rod 116 is fixedly secured at one end to the member 114 and at the other end to a piston (not shown) which is axially slidably fitted in the cylinder 112. The piston divides the interior of the cylinder 112 into first and second chambers (not shown) which communicate with lines 118 and 120, respectively. Each of the first and second chambers is selectively communicable with a pressurized hydraulic fluid source for supply or pressurized hydraulic fluid thereinto and with a drain for discharge of hydraulic fluid therefrom through the corresponding line. A rod 122 is fixedly secured at one end to the cylinder 112 and is connected at the other end to a guide arm 14 through a ball joint 68 so that the cylinder 112 and the rods 116 and 122 are universally rockable relative to the guide arm 14.

When the steering control mechanism 110 is stored into the vehicle, pressurized hydraulic fluid is fed into the first chamber through the line 118 and hydraulic fluid is discharged from the second chamber through the line 120 to axially move the rod 116 toward the ball joint 68 so that the guide arm 14 is raised into a storage position shown in FIG. 5 similarly as described hereinbefore with reference to the embodiment of FIGS. 2 and 3. When the steering control mechanism 110 is released from the vehicle for use, pressurized hydraulic fluid is fed into the second chamber through the line 120 and hydraulic fluid is discharged from the first chamber through the line 118 to axially move the rod 116 away from the ball joint 68 so that the guide arm 14 is moved into an operative position shown in FIGS. 2 and 4 as easily understood from the description made above with reference to the embodiment of FIGS. 2 and 3.

When the vehicle is provided with the steering control mechanism 10 or 110 on left and right sides of a rear part of the vehicle body as well as on left and right sides of a front part of the vehicle body, the vehicle body is surely held in the center of a curvilinear guideway during travel of the vehicle on the guideway and is prevented its rear part from being touched the guide rail of the guideway.

A current collector (not shown) may be mounted on an upper flange 124 of the clevis 22 of each of the steering control mechanisms 10 and 110.

It will be appreciated that a guide arm of a steering control mechanism according to the invention is movable into a storage position in which the guide arm is raised near a vertical plane and extends upwardly and obliquely from a support structure, and that the steering control mechanism is stored at the storage position in a vehicle.

It will be appreciated that a vehicle is held in the center of a guideway so that the vehicle is prevented a rear part of the vehicle body from touching a guide wall of the guideway during travel on a curvilinear guideway.

What is claimed is:

1. A steering control mechanism for a vehicle comprising, a support structure, a guide arm, means for connecting said guide arm to said support structure for universally swinging movement, a guide element supported on said guide arm for engagement with a guide wall of a guideway for a vehicle, said guide arm being swingable between an operative position in which said guide element is positioned in use for engagement with said guide wall to guide the direction of travel of said vehicle along said guide wall and an inoperative position in which said guide element is out of engagement with said guide wall, a first control arm foldable at its mid portion, means for connecting said first control arm to said support structure for universally swinging movement, means for connecting said first control arm to said guide arm for pivotal movement, operating means for folding and unfolding said first control arm for swinging said guide arm toward and away from said support structure, a second control arm, means for connecting said second control arm to said support structure for universally swinging movement, said guide arm being located between said first and second control arms, and means for connecting said second control arm to said guide arm and for lifting said guide arm from said operative position into said inoperative position when said guide arm is swung toward said supporting structure by said first control arm and for lowering said guide arm from said inoperative position into said operative position when said guide arm is swung away from said support structure by said first control arm.

2. A steering control mechanism as claimed in claim 1, in which said first control arm comprises a first link connected at one end to said guide arm through a pin joint, a second link having a ball joint connected at one end to said support structure, and a collar to which each of said links is connected at the other end through a pin joint and which is formed with a bore having internal threads formed in its internal wall, and said operating means comprises a shaft rotatably extending through said bore of said collar and connected at one end to said guide arm through a ball joint and formed therein with external threads engaging said internal threads of said collar, and drive means for rotating said shaft about its axis to move said collar on said shaft, and said second control arm comprises a first link connected at one end to said guide arm through a pin joint and a second link connected at one end to said support structure through a ball joint and at the other end to said first link through a pin joint.

3. A steering control mechanism as claimed in claim 2, in which each of said first and second links of said first control arm comprises opposite upper and lower beams joined together at said one end and diverted from each other toward said other end and connected to said collar through said pin joint, and a brace extending laterally between and connected to said beams.

4. A steering control mechanism as claimed in claim 2, in which said links of said first control arm extend convexly away from said ball joint at the junction between said shaft and said guide arm when said guide arm is in said operative position.

5. A steering control mechanism as claimed in claim 4, in which said shaft has an enlarged portion with an end which said collar abuts when said guide arms is in said operative position.

6. A steering control mechanism as claimed in claim 2, in which said links of said second control arm are loosely hung when said guide arm is in said operative position.

7. A steering control mechanism as claimed in claim 1, in which said first control arm comprises a first link connected at one end to said guide arm through a pin joint, a second link connected at one end to said support structure through a ball joint, and a cylindrical member to which each of said links is pivotably connected at the other end through a pin joint, and said operating means comprises a rod fixedly secured at one end to said cylindrical member, a hydraulic cylinder connected to said guide arm through a ball joint, and a piston fixedly secured to the other end of said rod and axially slidably fitted in said hydraulic cylinder and dividing the interior of said cylinder into first and second chambers, first and second passage means defining passages communicating respectively with said first and second chambers, said first passage means feeding pressurized hydraulic fluid into said first chamber and at that time causing hydraulic fluid in said second chamber to be discharged therefrom through said second passage means for axially moving said rod toward said guide arms to swing said links toward each other to swing said guide arm toward said support structure, said second defining a passage feeding pressurized hydraulic fluid into said second chamber and at the time causing hydraulic fluid in said first chamber to be discharged therefrom through said first passage means for axially moving said rod away from said arm to swing said links away from each other to shift said guide arm from said inoperative position into said operative position, and said second control arm comprises a first link connected at one end to said guide arm through a pin jointed and a second link connected at one end to said support structure through a ball joint and at the other end to said first link through a pin joint.

8. In combination, a steering control mechanism and a vehicle, said steering control mechanism comprising, a support structure fixedly secured in use to a body of a vehicle, a guide arm, means for connecting said guide arm to said support structure for universally swinging movement, a guide element supported on said guide arm for engagement in use with a guide wall of a guideway for a vehicle, said guide arm being swingable between an operative position in which said guide element is in engagement in use with said guide wall to guide the direction of the travel of said vehicle along said guide wall and an inoperative position in which said guide element is out of engagement with said guide wall, a first control arm foldable at its mid portion, means for connecting said first control arm to said support structure for universally swinging movement, means for connecting said first control arm to said guide arm for pivotal movement, operating means for folding and unfolding said first control arm for swinging said guide arm toward and away from said support structure, a second control arm, means for connecting said second control arm to said support structure for universally swinging movement, said guide arm being located between said first and second control arms, and means for connecting said second control arm to said guide arm and for lifting said guide arm from said operative position into said inoperative position when said guide arm is swung toward said support structure by said first control arm and for lowering said guide arm from said inoperative position into said operative position when said guide arm is swung away from said support structure by said first control arm.

9. A combination as claimed in claim 8, in which said first control arm comprises a first link connected at one end to said guide arm through a pin joint, a second link connected at one end to said support structure through a ball joint, and a collar to which each of said links is connected at the other end through a pin joint and which is formed with a bore having internal threads formed in its internal wall, and said operating means comprises a shaft rotatably extending through said bore of said collar and connected at one end to said guide arm through a ball joint and formed therein with external threads engaging said internal threads of said collar, and drive means for rotating said shaft about its axis to move said collar on said shaft, and said second control arm comprises a first link connected at one end to said guide arm through a pin joint and a second link connected at one end to said support structure through a ball joint and at the other end to said first link through a pin joint.

10. A combination as claimed in claim 9, in which each of said first and second links of said first control arm comprises opposite upper and lower beams joined together at said one end and diverted from each other towards said other end and connected to said collar through said pin joint, and a brace extending laterally between and connected to said beams.

11. A combination as claimed in claim 9, in which said links of said first control arm extend convexly away from said ball joint at the junction between said shaft and said guide arm when said guide arm is in said operative position.

12. A combination as claimed in claim 11, in which said shaft has an enlarged portion with an end which said collar abuts when said guide arm is in said operative position.

13. A combination as claimed in claim 9, in which said links of said second control arm are loosely hung when said guide arm is in said operative position.

14. A combination as claimed in claim 8, in which said first control arm comprises a first link connected at one end to said guide arm through a pin joint, a second link connected at one end to said support structure through a ball joint, and a cylindrical member to which said links each are pivotably connected at the other end through a pin joint, and said operating means comprises a rod fixedly secured at one end to said cylindrical member, a hydraulic cylinder connected to said guide arm through a ball joint, and a piston fixedly secured to the other end of said rod and axially slidably fitted in said hydraulic cylinder and dividing the interior of said cylinder into first and second chambers, pressurized hydraulic fluid being delivable into said first chamber and concurrently hydraulic fluid being dischargable from said second chamber to axially move said rod toward said guide arm to swing said links toward each other to swing said guide arm toward said support structure, and said second control arm comprises a first link connected at one end to said arm through a pin joint and a second link connected at one end to said support structure through a ball joint and at the other end to said first link through a pin joint.

15. A combination of first, second, third and fourth steering control mechanisms with a vehicle, each of said steering control mechanisms comprising a support structure, said support structures of said first and second steering control mechanisms being fixedly secured respectively to front left and right parts of a body of said vehicle, said support structures of said third and fourth steering control mechanisms being fixedly secured respectively to rear left and right parts of said vehicle body, a guide arm, means for connecting said guide arm to said support structure for universally swinging movement, said guide arm supporting a guide element for engagement with a guide wall of a guideway for a vehicle, said guide arm being swingable between an operative position in which said guide element is in engagement with said guide to the direction of travel of said vehicle along said guide wall and an inoperative position in which said guide element is out of engagement with said guide wall, a first control arm foldable at its mid portion, means for connecting said first control arm to said support structure for universally swinging movement, means for connecting said first control arm to said guide arm for pivotal movement, operating means for folding and unfolding said first control arm for swinging said guide arm toward and away from said support structure, a second control arm, means for connecting said second control arm to said support structure for universally swinging movement, said guide arm being located between said first and second control arms, and means for connecting said second control arm to said guide arm and for lifting said guide arm from said operative position into said inoperative position when said guide arm is swung toward said support structure by said first control arm and for lowering said guide arm from said inoperative position into said operative position when said guide arm is swung away from said support structure by said first control arm.

16. A combination as claimed in claim 15, in which said first control arm comprises a first link connected at one end to said guide arm through a pin joint, a second link connected at one end to said support structure through a ball joint, and a collar to which each of said links is connected at the other end through a pin joint and which is formed with a bore having internal threads formed in its internal wall, and said operating means comprises a shaft rotatably extending through said bore of said collar and connected at one end to said guide arm through a ball joint and formed therein with external threads engaging said internal threads of said collar, and drive means for rotating said shaft about its axis to move said collar on said shaft, and said second control arm comprises a first link connected at one end to said guide arm through a pin joint and a second link connected at one end to said support structure through a ball joint and at the other end to said first link through a pin joint.

17. A combination as claimed in claim 16, in which each of said first and second links of said first control arm comprises opposite upper and lower beams joined together at said one end and diverted from each other toward said other end and connected to said collar through said pin joint, and a brace extending laterally between and connected to said beams.

18. A combination as claimed in claim 16, in which said links of said first control arm extend convexly away from said ball joint at the junction between said shaft and said guide arm when said guide arm is in said operative position.

19. A combination as claimed in claim 18, in which said shaft has an enlarged portion with an end which said collar abuts when said guide arm is in said operative position.

20. A combination as claimed in claim 16, in which said links of said second control arm are loosely hung when said guide arm is in said operative position.

21. A combination as claimed in claim 15, in which said first control arm comprises a first link connected at one end to said guide arm through a pin joint, a second link connected at one end to said support structure through a ball joint and a cylindrical member to which each of said links is pivotably connected at the other end through a pin joint, and said operating means comprises a rod fixedly secured at one end to said cylindrical member, a hydraulic cylinder connected to said guide arm through a ball joint, and a piston fixedly secured to the other end of said rod and axially slidably fitted in said hydraulic cylinder and dividing the interior of said cylinder into first and second chambers, pressurized hydraulic fluid beng delivered into said first chamber and concurrently hydraulic fluid being discharged from said second chamber to axially move said rod toward said guide arm to swing said links toward each other to swing said guide arm toward said support structure, and said second control arm comprises a first link connected at one end to said guide arm through a pin joint and a second link connected at one end to said support structure through a ball joint and at the other end to said first link through a pin joint.

* * * * *